DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 2, 1970

875 O.G. 11

T875,001

TEXTILE FIBER FINISH CONTAINING BIOCIDE AND FUNGICIDE

Robert Tilden Burrus and Neil Lamar Finch, Sr., Kinston, N.C., assignors to E. I. du Pont de Nemours and Company, Wilmington, Del., a corporation of Delaware

Filed Sept. 27, 1968, Ser. No. 763,395

Int. Cl. D06m *13/34, 13/28*

U.S. Cl. 252—8.8

No Drawing. 17 Pages Specification

Fibers having on their surfaces a lubricating composition comprising a finish base and an effective amount of 2,2′-thiobis-(4,6-dichlorophenol) bactericide, and 3,5-dimethyltetrahydro-1,3,5,2H-thiadiazine-2-thione fungicide resist fungus and bacteria, discoloration, oxidation and abrasion in processing. The finish base is a wax with an oil carrier; the following is a preferred finish base formation:

| | Parts |
|---|---|
| Refined coconut oil | 68.2 |
| Polyoxyethylene/sorbitol tetraoleatelaurate | 20.0 |
| Polyoxyethylene/sorbitol septaoleate | 10.0 |
| Orthophenylphenol | 1.8 |
| No. 50 white oil | 350.0 |
| Aluminum monopalmitate | 8.0 |
| Oxidized polyethylene (2500 M.W.) | 40.0 |
| 2,2′-thiobis(4-methyl-6-tertiary butyl phenol) | 2.0 |

The bactericide and fungicide are effective in amounts of about 0.25% each by weight of the finish base. The invention is particularly useful for fibers used in making ropes.